United States Patent [19]
Seki et al.

[11] Patent Number: 4,938,188
[45] Date of Patent: Jul. 3, 1990

[54] ENGINE CONTROL APPARATUS

[75] Inventors: Yasunari Seki, Utsunomiya; Isao Yahata, Takanezawamachi, both of Japan

[73] Assignee: Honda Giken Kogyo Kabushiki Kaisha, Tokyo, Japan

[21] Appl. No.: 386,661

[22] Filed: Jul. 31, 1989

[30] Foreign Application Priority Data

Aug. 1, 1988 [JP] Japan .................................. 63-192242

[51] Int. Cl.⁵ .......................... F02D 17/02; F01L 1/34
[52] U.S. Cl. .................................... 123/333; 123/90.16; 123/493
[58] Field of Search ............... 123/333, 345, 346, 347, 123/348, 90.15, 90.16, 493

[56] References Cited
U.S. PATENT DOCUMENTS

| 3,735,742 | 5/1973 | Aono et al. | 123/333 |
| 4,494,506 | 1/1985 | Hayama et al. | 123/348 |
| 4,534,323 | 8/1985 | Kato et al. | 123/90.16 |
| 4,638,781 | 1/1987 | Shiki et al. | 123/333 |
| 4,651,684 | 3/1987 | Masuda et al. | 123/348 |
| 4,727,831 | 3/1988 | Nagahiro et al. | 123/90.16 |
| 4,788,946 | 12/1988 | Inoue et al. | 123/90.16 |

FOREIGN PATENT DOCUMENTS

0090718 5/1984 Japan .................................. 123/348

Primary Examiner—Tony M. Argenbright
Assistant Examiner—Robert E. Mates
Attorney, Agent, or Firm—Armstrong, Nikaido, Marmelstein, Kubovcik & Murray

[57] ABSTRACT

An engine control apparatus wherein an engine output can be adjusted in accordance with an allowable revolution speed of the engine at each valve timing so that while the engine can operate at a revolution speed of up to the highest allowable speed range when operating at a valve timing at which the allowable revolution in speed is high, it can nevertheless operate advantageously without experiencing damage to the timing belt and valve jump even when operated at a valve timing having a lower allowable revolution speed range.

3 Claims, 8 Drawing Sheets

ENGINE CONTROL APPARATUS

BACKGROUND OF THE INVENTION

This invention generally relates to a control apparatus for preventing over-revolution of an engine of the type that permits the changing of valve opening-closing timing and/or valve-lift amount for a valve on at least one of an intake side and an exhaust side. In the following description, the change of the opening-closing timing and/or the lift amount is referred to as the change of valve timing.

There is known, from the Japanese Examined Patent Application Publication No. 49-33289, that an engine wherein valve timing for one or more of intake and/or exhaust valves can be changed over. There is also known that an engine of the type in which, when a revolution speed of the engine has risen to a predetermined high revolution speed; i.e., the revolution speed limiter value, fuel supply to the engine is stopped in order to prevent an over-revolution speed for the engine.

SUMMARY OF THE INVENTION

A load acting on a timing belt that drives a valve mechanism changes with the valve-opening operation acceleration. With the valve-lift amount remaining constant, the shorter the valve-open duration, the greater the acceleration becomes. With the valve-open duration being constant, the acceleration is greater when the valve-lift amount is greater. It should also be noted that valve jump is more likely to occur when the acceleration is greater. Therefore, an allowable revolution speed limit without resulting in damage to the timing belt or the occurrence of valve jump should vary with changes in the valve timing.

However, the above-noted revolution speed limiter value is typically set up regardless of the valve timing, in which case, the revolution speed limiter value should be set so as to be tuned to the valve timing wherein the acceleration at the time of valve-opening operation is largest. Thus, revolution speed of an engine cannot be increased to the fullest allowable limit even when the engine is set at such a valve timing that the acceleration is smaller so that the allowable revolution speed limit is higher.

In view of the foregoing disadvantages, it is an object of the present invention to provide an engine control apparatus designed to attain a further extension of the upper limit of revolution speed of an engine, yet provides protection of the engine against any possible damage.

To achieve the above object, the present invention includes an engine control apparatus having a valve-timing changing means for changing a valve opening-closing timing and/or a valve-lift amount for a valve on at least one of the intake and the exhaust sides, a reduction means for reducing engine output when the revolution speed of the engine has reached a predetermined upper-limit revolution speed during acceleration of the engine, and a revolution speed change means for changing the predetermined upper-limit revolution speed according to the changed valve opening-closing timing and/or valve-lift amount effected by the valve-timing changing means.

The revolution speed change means generally includes a means for stopping the supply of fuel to the engine, but it can also be arranged so that it includes a means for reducing an amount of fuel being supplied to the engine or for delaying the ignition timing of the engine.

The above-mentioned valve-timing changing means generally includes a means for changing over the valve timing between two stages, one stage being a low-speed valve timing suitable for a range of low-speed revolution of the engine, and the other stage being a high-speed valve timing suitable for a range of high-speed revolution of the engine, but it can be such that the valve timing may be changed continuously.

Since a predetermined upper-limit revolution speed (hereinafter, referred to as "revolution limiter valve") set for reducing engine output can be changed in accordance with change of the valve timing, the revolution limiter value is set at a high level for operation at a valve timing at which the acceleration of the valve opening operation is small so that the engine may be permitted to operate at a revolution speed of up to the highest allowable speed range of revolution. The revolution limiter value can also be set at a low level for operation at a valve timing at which the acceleration is greater so that possible damage to the timing belt and the occurrence of valve jump may be prevented.

The foregoing and other objects, features and advantages of this invention will be apparent from the following, more particular, description of the preferred embodiments of this invention, as illustrated in the accompanying drawings.

BRIEF DESCRIPTION OF THE DRAWINGS

FIG. 7, which includes both FIGS. 7A and 7B, is a flow chart of the valve timing changeover control routine;

DETAILED DESCRIPTION OF THE PREFERRED EMBODIMENTS

Figure 1:
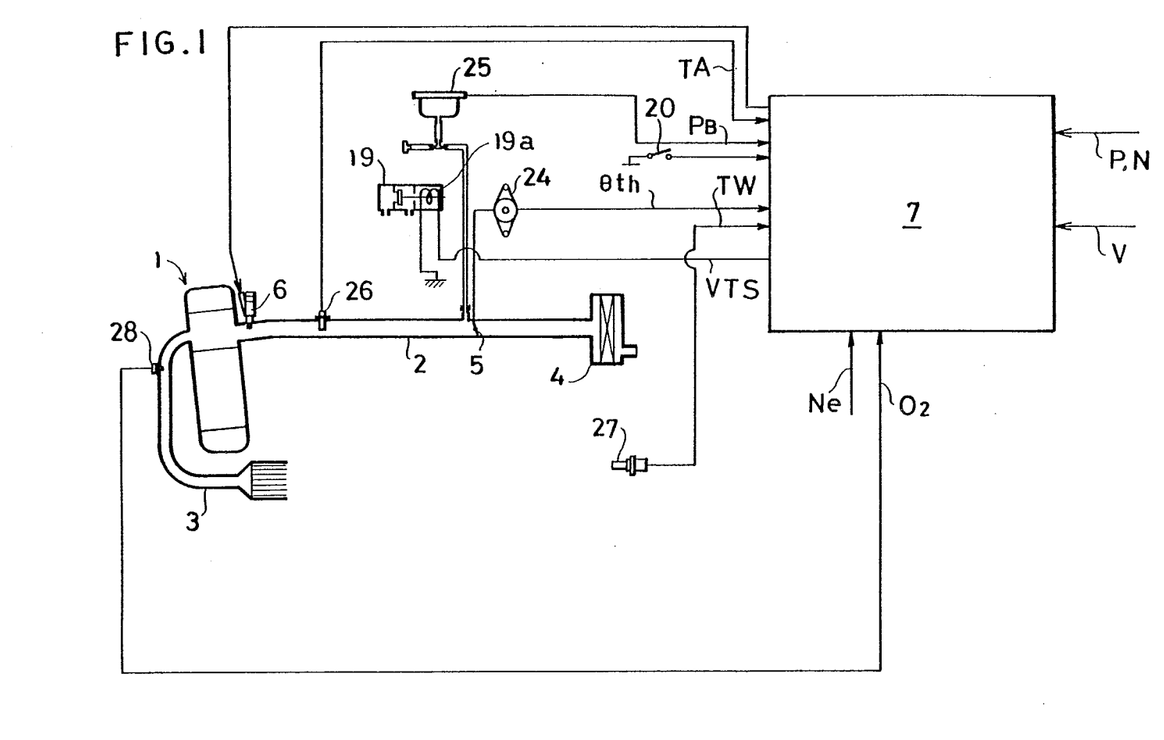
FIG. 1 is a schematic diagram showing the structural arrangement in which the present invention is applied to an engine.

Referring now to FIG. 1, reference numeral 1 generally refers to an engine body, reference number 2 denotes an intake passage, and reference number 3 designates an exhaust passage. The intake passage 2 is provided with an air cleaner 4, a throttle valve 5 and an injector 6, in that order, from the upstream side of the intake passage. A quantity of fuel injection made through the injector 6 is variably controlled by an electronic control circuit 7 so that the above-described engine can be an electronically controlled fuel injection type.

Figure 2:
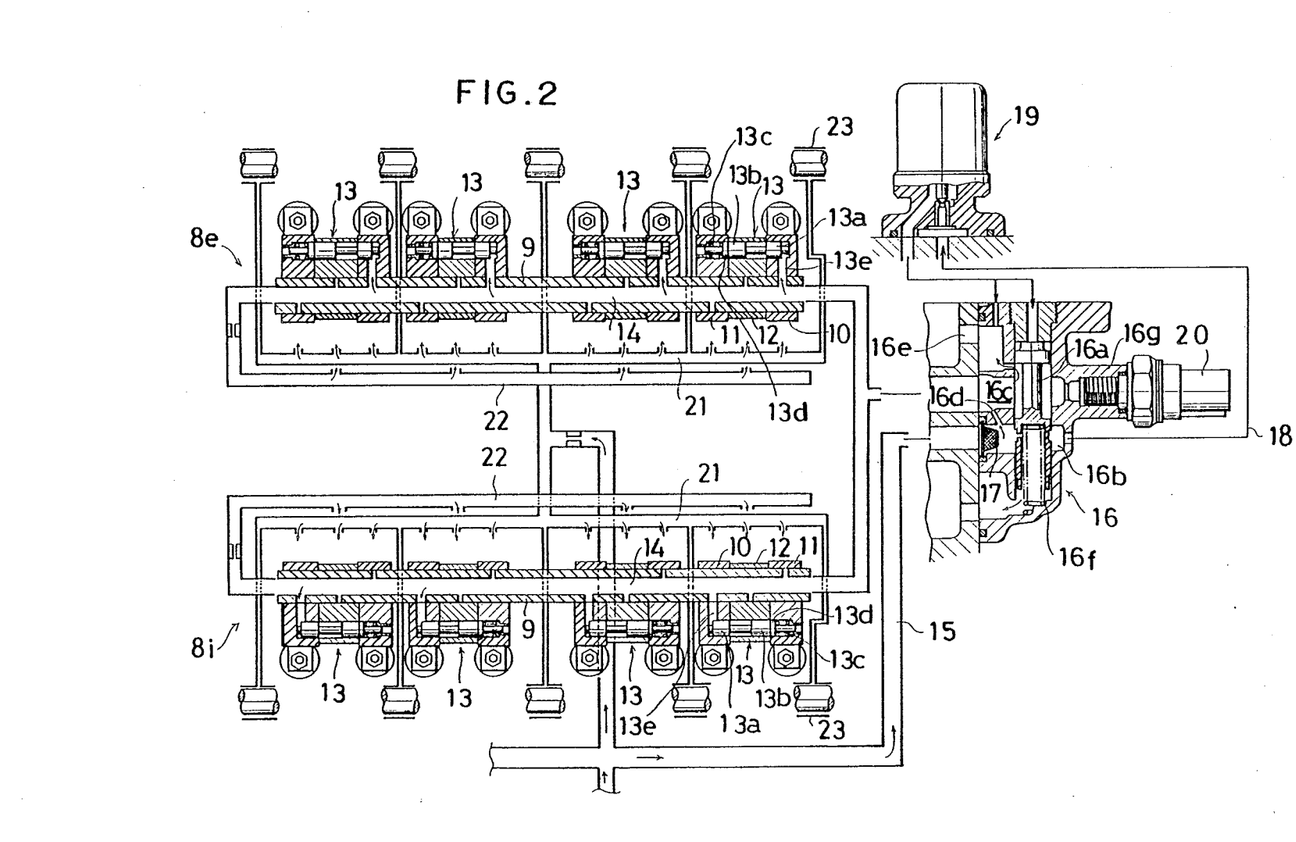
FIG. 2 is a diagram illustrating a valve timing changeover mechanism according to this invention.

The engine used in this embodiment of the present invention is a double overhead cam (DOHC), in-line four-cylinder engine having a pair of intake and exhaust valves for each cylinder and as shown in FIG. 2, is further provided with a valve mechanism 8i at the intake valve side and another valve mechanism 8e at the exhaust valve side. The valve mechanisms are operated to drive these intake and exhaust valves to open and close.

Both the valve mechanism 8i and 8e are basically of the same construction so that detailed explanation will hereinafter be made only of the intake-side valve mechanism. Both of the valve mechanisms are assigned with the same symbols and reference numerals for their corresponding parts.

Figure 10:
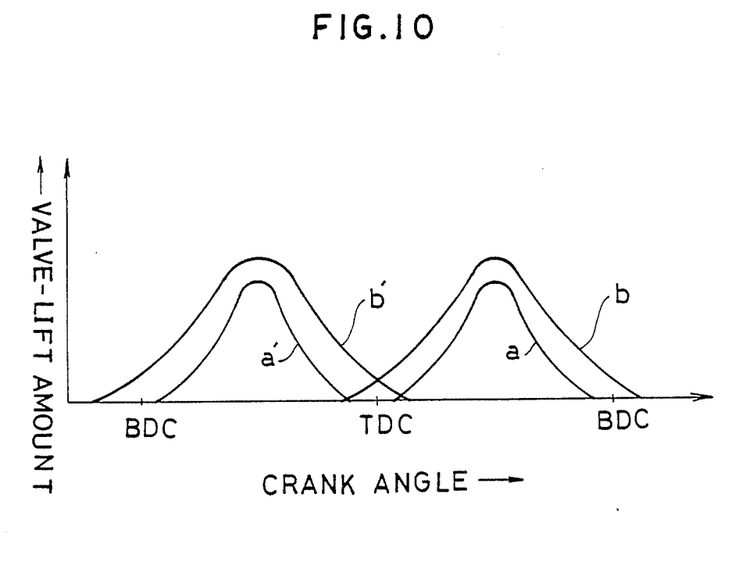
FIG. 10 is a diagram showing the valve opening-closing operation characteristics of the intake and exhaust valves.

The intake-side valve mechanism 8i includes a rocker shaft 9 for the intake valve; a pair of driving rocker arms 10, 11 pivotally supported on the rocker shaft 9 for driving a pair of the intake valves of each cylinder and a free rocker arm 12 located between the pair of the driving rocker arms 10, 11 and also pivotally supported on the rocker shaft 9. The driving rocker arms 10, 11 are interlocked with a low-speed cam formed on a cam shaft for the intake valves and the free rocker arm 12 is interlocked with a high-speed cam formed on the cam shaft. The intake-side valve mechanism 8i further includes a changeover mechanism 13 through which both the driving rocker arms 10, 11 are detachably connected to the free rocker arm 12. In the above-described structural arrangement, when the driving rocker arms 10, 11 are disconnected from the free rocker arm 12, the intake valves are operated to open and close with a low-speed valve timing at which time the valve-open duration and the valve-lift amount are made relatively smaller by means of the low-speed cam, as indicated by the curve a in FIG. 10. On the other hand, when the rocker arms 10, 11, 12 are connected to each other, the intake valves are operated at a high-speed valve timing at which time the valve-open duration and the valve-lift amount are relatively larger, as indicated by the curve b and also as shown in FIG. 10. The curves a' and b' in FIG. 10 represent, respectively, the opening-closing operation characteristics of the exhaust valve at the low-speed valve timing and at the high-speed valve timing.

The changeover mechanism 13 includes a first connecting pin 13a which can be engaged with an disengaged from the free rocker arm 12. The first connecting pin 13a is inserted in the first driving rocker arm 10; i.e., one of the two driving rocker arms 10, 11. The changeover mechanism 13 further includes a second connecting pin 13b which can be engaged with and disengaged from the second driving rocker arm 11; i.e., the other of the two driving rocker arms 10, 11. The second connecting pin 13b is inserted in the free rocker arm 12. The changeover mechanism 13 also includes a restriction pin 13d urged toward the free rocker arm 12 by a spring 13 inserted in the second driving rocker arm 11. In the first driving rocker arm 10, there is a hydraulic chamber 13e for providing an oil pressure for pushing the first connecting pin 13a toward the free rocker arm 12; the hydraulic chamber 13e being communicated with an oil supplying passage 14 formed in the rocker shaft 9. When the hydraulic chamber 13e is charged with a hydraulic oil through the oil-supplying passage 14, the first connecting pin 13a becomes engaged with the free rocker arm 12, and pushed by the first connecting pin 13a, the second connecting pin 13b engages with the second driving rocker arm 11 so that both the driving rocker arms 10, 11 and the free rocker arm 12 are connected to each other for changing the valve timing to a high-speed. On the other hand, when oil pressure in the hydraulic chamber 13e is lowered, the second and the first connecting pins 13a, 13b are urged by the spring 13c through the restriction pin 13d and, thus, pushed back in to the free rocker arm 12 and the first driving rocker arm 10, respectively, in order to disconnect both the driving rocker arms 10, 11 from the free rocker arm 12 and to change the valve timing to a low-speed.

Subsequently, an oil passage 15 for supplying oil from an oil pump (not shown) is connected to the oil supplying passage 14 through a changeover valve 16 attached to an end portion of the cylinder head so that when a spool type valve body 16a of the changeover valve 16 is positioned at the upper closed position, an inlet port 16b communicated with the oil passage 15 through an oil filter 17 and an outlet port 16c communicated with the oil supplying passage 14 may be communicated with each other only through an orifice 16d. At this time, the outlet port 16c communicates with a drain port 16e which opens in the upper space in the cylinder head resulting in the oil pressure in the oil supplying passage 14 being decreased. When the spool type valve body 16a is shifted to the lower open position, the inlet port 16b and the outlet port 16c communicate with each other through an annular groove provided in the spool type valve body 16a, while the outlet port 16c becomes disconnected from the drain port 16e so that the oil pressure in the oil supplying passage 14 is increased.

The spool type valve body 16a is arranged in a manner such that the changeover thereof to the open position is carried out against the urging force of a spring 16f by pilot pressure inputted through a pilot oil passage 18 which branches out from the inlet port 16b. The pilot oil passage 18 is provided with a normally closed type electromagnetic valve 19. An electric current for energizing a solenoid 19a of the electromagnetic valve 19 is controlled by an output signal (VTS) from the electronic control circuit 7, as shown in FIG. 1. When the electromagnetic valve 19 is opened with the energization of the solenoid 19a, the spool type valve body 16 is turned to its open position so that the valve timing is changed over to a high-speed, as described in the foregoing. When the electric current for energizing the solenoid 19a is stopped so as to close the electromagnetic valve 19, the spool type valve body 16a is changed over to the closed position so that the valve timing is changed over to low-speed.

In addition, in order to confirm the changeover operation of the spool-type valve body 16a, a hydraulic switch 20 is provided on a housing 16g for the changeover valve 16 for detecting oil pressure at the outlet port 16 and for being turned on when the detected oil pressure is low, and for being turned-off when the detected oil pressure is high.

Referring now to FIG. 2, reference numeral 21 denotes a lubricant passage of the valve mechanism, reference number 22 designates a lubricant passage of the valve mechanism for the high-speed valve timing operation, and reference number 23 denotes a cam holder.

The valve timing changeover means and oil passage arrangement described above are not particularly different from those disclosed in the Japanese Utility Model Registration Application No. 63-82588, filed on June 22, 1988 by the applicants of the present invention so that any further detailed explanation thereof is omitted. Inputted in the electronic control circuit 7 are engine revolution speed (Ne) signals from an engine revolution speed sensor, throttle opening-degree (Θ th) signals from a throttle opening sensor 24, intake negative pressure ($P_B$) signals and intake temperature (TA) signals, respectively, from a pressure sensor 25 and a temperature sensor 26, both of which are connected to the intake passage 2 downstream of the throttle valve 5, water temperature (TW) signals from a water temperature sensor 27, vehicle speed (V) signals from a vehicle speed sensor, signals from the hydraulic switch 20, and $O_2$ signals from an oxygen concentration sensor 28 provided in the exhaust passage 3 and, in case of an automatic transmission car, additional parking (P) and neutral (N) signals from a shift lever position switch. Based on the operating condition determined from these signals, an appropriate fuel injection quantity is calculated and a suitable valve timing selected.

Here, the following equation is applicable:

$$Tout = K_1 Ti + K_2,$$

where Tout stands for fuel injection quantity, Ti represents the standard fuel injection quantity, $K_1$ stands for correction factor, and $K_2$ stands for a constant value. It should be noted that $K_1$ as used herein includes: an intake temperature correction factor $K_{TA}$ by which the fuel injection quantity is increased when the intake temperature and/or the water temperature are low; a high-load fuel increase factor $K_{WOT}$ by which the fuel injection quantity is increased in a prescribed high-load region determined by the water temperature correction factor $K_{TW}$, Ne, $P_B$ and Θ th; and a feedback correction factor $KO_2$ by which a deviation of the A/F ratio from the theoretical value of A/F ratio is an $O_2$ feedback region with a comparatively low engine revolution speed (e.g., 4,000 rpm or lower) is corrected, while $K_2$ includes a fuel increase constant for acceleration by which the fuel injection quantity is increased during the acceleration of a car.

The standard fuel injection quantity Ti is set in such a manner that an intake mixture, in combination with a quantity of air intake into a cylinder in a particular operating condition of the engine determined by Ne and $P_B$, may provide a desired A/F ratio close to the theoretical value of the A/F ratio. Two sets of Ti maps, one for the low-speed valve timing and the other for the high-speed valve timing, are prepared and stored in the electronic control circuit 7.

Figure 3:
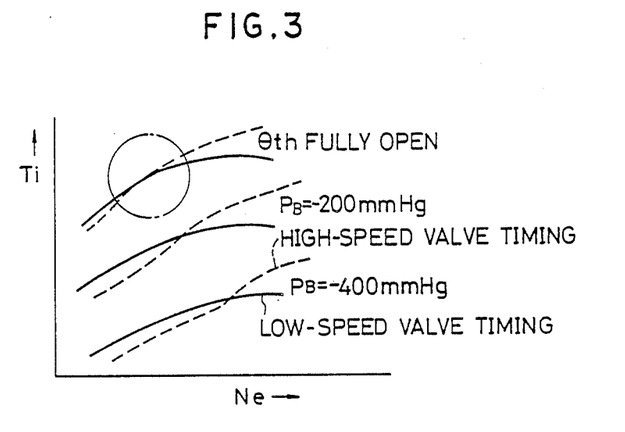
FIG. 3 is a diagram showing the characteristic curves for fuel injection quantities set for a high-speed valve timing and a low-speed valve timing.

In FIG. 3, the Ti value in the Ti map for the low-speed valve timing is indicated by a solid line curve, while the Ti value in the Ti map for the high-speed valve timing is indicated by a dotted line curve. As shown in FIG. 3, the intake air quantity tends to level off with the increase of Ne at the low-speed valve timing. On the other hand, at the high-speed valve timing, the air intake quantity keeps on increasing further to eventually surpass the air intake quantity at the low-speed valve timing as the charging efficiency increases with the increase of Ne so that the Ti value for the low-speed valve timing and that for the high-speed valve timing coincide with the each other at some point on the curves. At this point, the air intake quantity is the same whether at the low-speed valve timing or at the high-speed valve timing. This also holds true for the A/F ratio at this point. Therefore, the engine output is also practically the same at this point.

Figure 4:
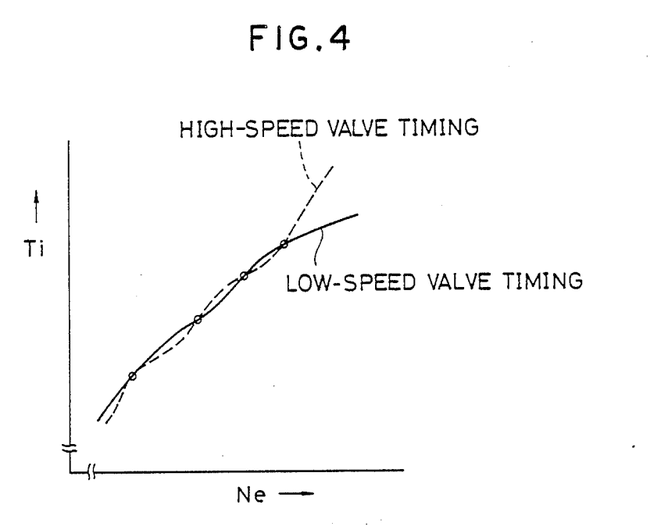
FIG. 4 is an enlarged view of a portion encircled in FIG. 3.

The charging efficiency gradually fluctuates with the change of Ne. This fluctuation becomes more conspicuous in the range approaching the point at which the throttle opening (Θ th) is fully opened so that, as shown in FIG. 4, the Ti value for the low-speed valve timing and that for the high-speed valve timing become equal at a plurality of points. As will be discussed later, when the valve timing is changed over to one of these points where the Ti value for the low-speed valve timing and that for the high-speed valve timing become equal, the valve timing changeover is more likely to cause hunting, especially in the range where the throttle opening is large; thus, adversely affecting durability of the changeover mechanism 13.

Figure 5:
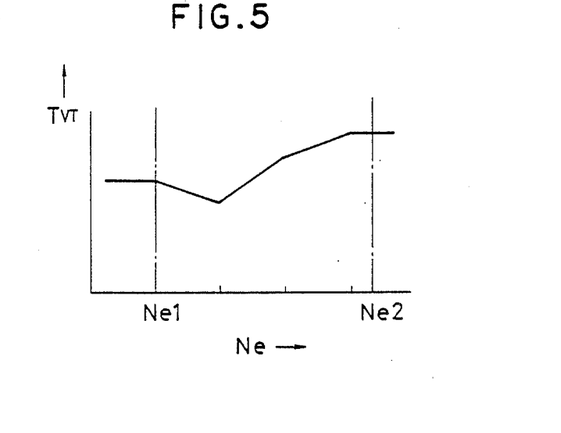
FIG. 5 is a diagram showing a $Ti_{VT}$ table.

In the high-load region, the mixture is enriched according to the above-mentioned high-load fuel increase factor $K_{WOT}$. Since a higher output can be brought about with the high-speed valve timing in this high-load region, a high-load determinant reference value $T_{VT}$ based on the fuel injection quantity is experimentally obtained as shown in FIG. 5. A $T_{VT}$ value corresponding to Ne is calculated from a $T_{VT}$ table and when Tout is greater than $T_{VT}$, the valve timing is changed over to the high-speed value as will later be explained. In this manner, if the Tout $\geq T_{VT}$ region includes regions in which, as discussed in the foregoing, Ti values for the low-speed valve timing and the high-speed valve timing become equal, the above-mentioned hunting occurring with the changeover of the valve timing can be prevented. A $T_{VT}$ table applicable to an automatic transmission vehicle is different from that which is applicable to a manual transmission vehicle.

In order to prevent an over-revolution speed of the engine, fuel supply to the engine is stopped when Ne exceeds the revolution limiter value $N_{HFC}$. If a load acting on the timing belt is considered in this connection, it can be seen that the greater the acceleration of the valve opening operation is, the greater the load on the timing belt also becomes and, additionally, the revolution speed Ne which causes a valve jump becomes lower with an increase in the acceleration rate. As is apparent from FIG. 10, the acceleration is greater at the low-speed valve timing so that an allowable revolution speed of the engine is lower at the low-speed valve timing than at the high-speed valve timing. In this embodiment, therefore, the revolution limiter value is set at a comparatively lower $N_{HFC1}$ value (e.g., 7500 rpm) for the low-speed valve timing and at a comparatively higher $N_{HFC2}$ value (e.g., 8100 rpm) for the high-speed valve timing.

Figure 6:
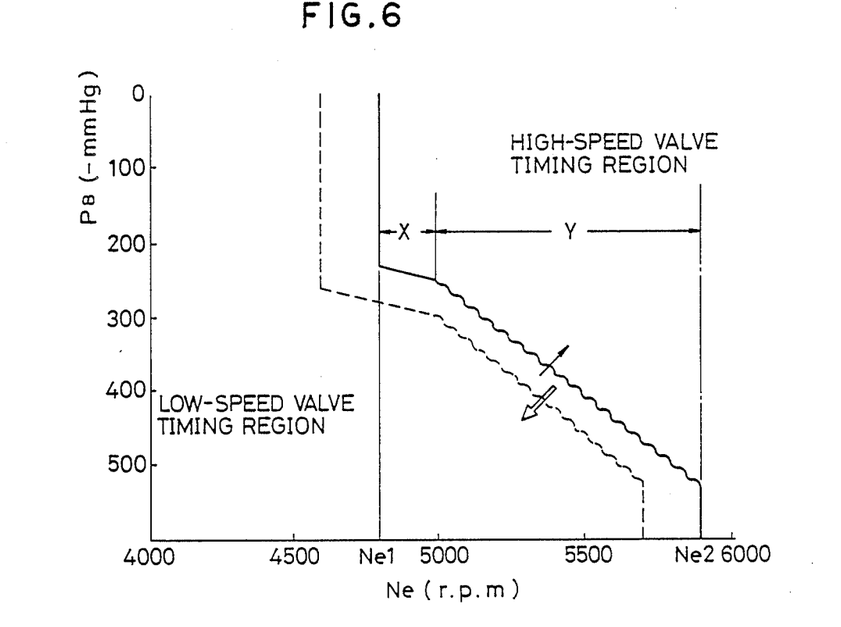
FIG. 6 is a diagram showing valve timing changeover characteristics.

Next, in reference to FIG. 6, an explanation will now be made of valve timing changeover characteristics. In FIG. 6, a solid-line curve shows the changeover characteristic observed when the valve timing is changed over from the low-speed value to the high-speed value, while the dotted-line curve shows the changeover characteristics when the valve timing is changed over in the opposite manner.

A valve timing changeover is performed in a region of the engine revolution speeds ranging between the lower-limit engine revolution speed Ne1 at which the engine output obtained with the low-speed valve timing always exceeds that which is obtained with the high-speed valve timing. The upper-limit engine revolution speed Ne2 at which the engine output obtained with the high-speed valve timing always exceeds that which is obtained with the low-speed valve timing. In this embodiment of the present invention, the valve timing changeover from the low-speed value to the high-speed value, and vice-versa, are set so as to have a hysteresis (e.g., Ne1 set at 4800 rpm/4600 rpm, and Ne2 at 5900 rpm/5700 rpm).

In FIG. 6, the region or range represented by X is one in which the valve timing changeover is performed through comparison of $T_{VT}$ with Tout, while the region or range denoted by Y is one in which the valve timing changeover is performed through comparison made between a Ti value in the Ti map (hereinafter, referred to as "$Ti_L$ Map") for the low-speed valve timing and a Ti value in the Ti map (hereinafter, referred to as "$Ti_H$ map") for the high-speed valve timing. Since the changeover characteristic in the X region is also affected by other parameters other than Ne and $P_B$ having much to do with the calculation of Tout, the characteristics cannot be exactly shown in the graph of FIG. 6 wherein the horizontal axis represents Ne and the vertical axis represents $P_B$ so that the changeover characteristic in the X-region shown in FIG. 6 is more for an illustration purpose.

Figures 7, 7A:
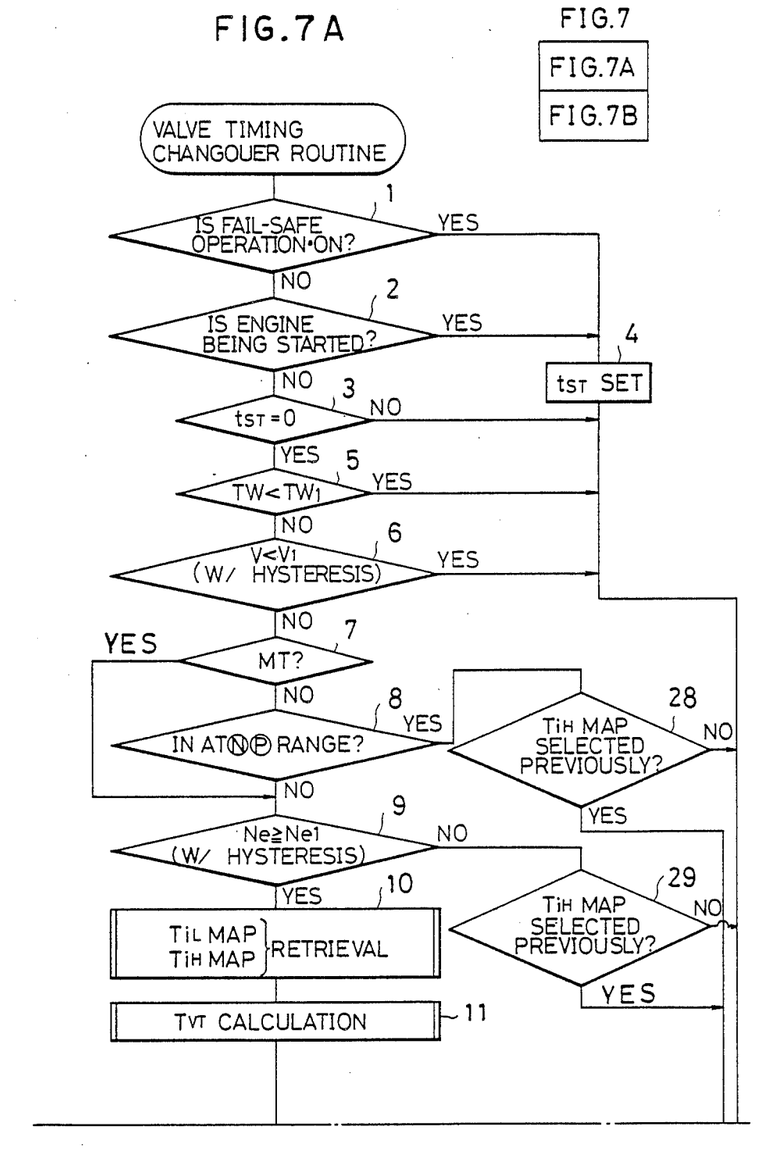
Figure 7B:
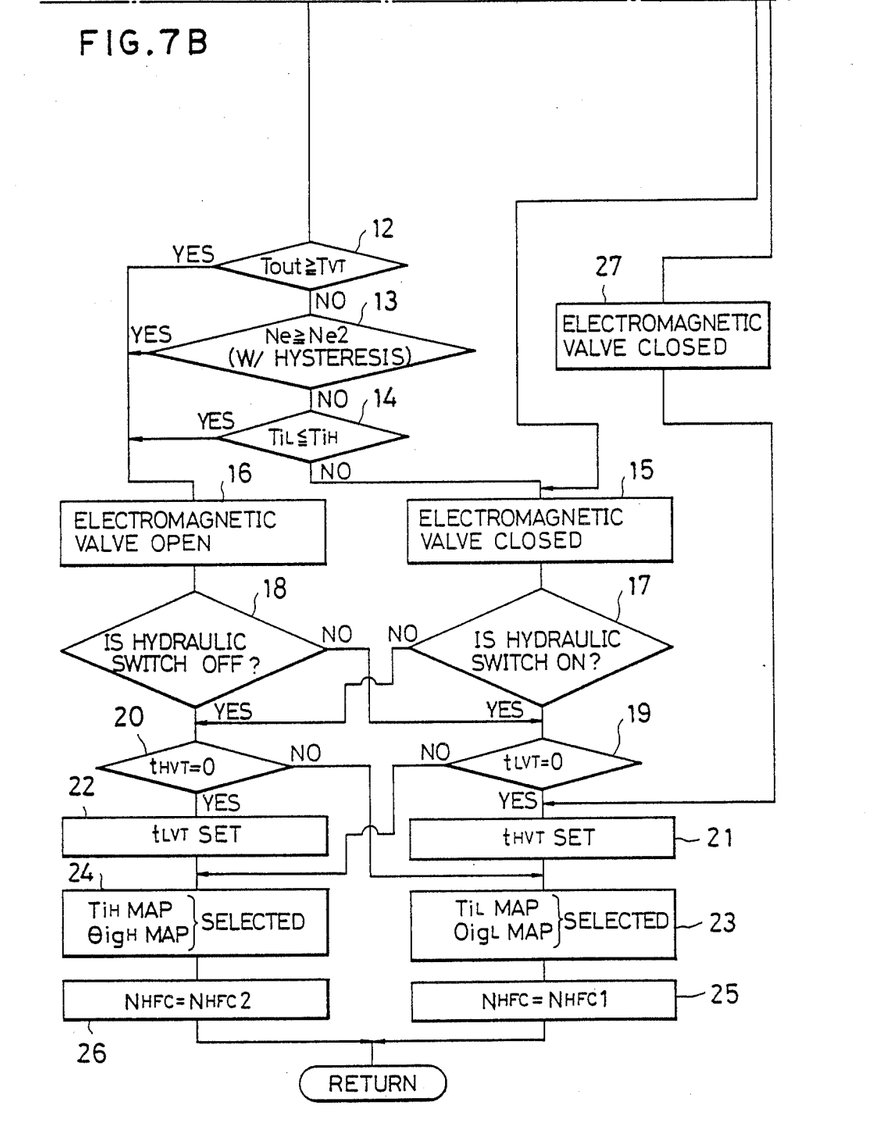

Next, in reference to FIG. 7, the control by the electronic control circuit 7 of the valve timing changeover is hereafter explained. In other words, a control program for the output of signal VTS to the electromagnetic valve 19 is hereinafter explained.

Step 1 is a step for determining whether or not signals from the respective sensors are being normally inputted into the electronic control circuit 7 or a step for determining whether to start a fail-safe operation. Step 2 is a step for determining whether or not the engine is being started and step 3 is a step for determining whether or not the remainder time $T_{ST}$ of the delay timer has elapsed to 0. A time setting for $T_{ST}$ (e.g., 5 seconds) is performed in step 4 during the engine starting so that the timing operation may start after the start of the engine. A step 5 is a step for determining whether or not the water temperature TW is lower than the preset temperature TW2 (e.g., 60° C.); i.e., whether or not the warming up of the engine has been achieved. Step 6 is a step for determining whether or not the vehicle speed V is lower than the present lowest vehicle speed V1 (e.g., 8 km/5 km with a hysteresis). Step 7 is for determining whether or not it is a manual vehicle (MT). Step 8 is for determining, in case of an automatic vehicle (AT), whether the shift lever is set at the parking (P) position or the neutral (N) position, while a step 9 is for determining whether or not Ne is greater than the abovementioned lower-limit value Ne1 so that when the fail-safe operation is operating or the engine is being started or the time preset with the delay timer has not yet elapsed after the start of the engine, or warming up of the engine is going on, or the vehicle is parked or running at a slow speed, or the shift gear is set at P or N position or Ne is smaller than Ne1, the electromagnetic valve 19 is closed to hold the valve timing set at the low-speed level as will later be explained.

When it is determined at the step 9 that Ne>Ne1, the $Ti_L$ map and $Ti_H$ map are retrieved at step 10 in order to obtain a Ti value in the $Ti_L$ map (this value being hereinafter referred to as "$Ti_L$") and a Ti value in the $Ti_H$ map (this value being hereinafter referred to as "$Ti_H$") which corresponds to the current Ne and $P_B$. Then, in a next step 11, a $T_{VT}$ corresponding to Ne is calculated from the $T_{VT}$ table. In step 12, this $T_{VT}$ is compared with Tout which has been obtained previously (i.e., Tout obtained in the immediately preceding round of operation) so as to determine whether or not Tout>$T_{VT}$(i.e., to determine whether it is in the high-load condition in which the mixture is enriched). When it is found that Tout is smaller than $T_{VT}$, the program is advanced to step 13 for determining whether or not Ne is higher than the aforementioned upper-limit value Ne2 or not. If it is found that Ne is smaller than Ne2, the program is advanced to step 14 in order to compare $Ti_L$ and $Ti_H$ with each other, both of which have been obtained at the step 10. If $Ti_L$ is larger than $Ti_H$($Ti_L$>$Ti_H$), a command or an instruction to close the electromagnetic valve 19 is given out at a step 15; this instruction being tantamount to one for changing over the valve timing to the low-speed level. When Tout≧$T_{VT}$, Ne≧Ne2 or $Ti_L$≦$Ti_H$, a command or an instruction to open the electromagnetic valve 19 (i.e., an instruction to change over the valve timing to the high-speed one is given out in a step 16). Further, when an instruction to open the valve 19 in the step 15 has been given out, it is determined at step 17 whether or not the hydraulic switch 20 has been turned on; i.e., whether or not the oil pressure in the oil supplying passage 14 has been reduced to a lower level. When the hydraulic switch 20 has been turned on, whether or not the remainder time $t_{LVT}$ for the low-speed valve timing changeover delay timer has been reduced to 0 is determined at step 19. When $t_{LVT}$=0, the remainder time $t_{HVT}$ for high-speed valve timing change-over delay timer is set to a predetermined time (e.g., 0.1 sec.) at a step 21.

Next, at a step 23, a selection processing is performed to select the $Ti_L$ map as a Ti map for use with a fuel injection control routine, and the ignition timing map for the low-speed valve timing (Θ igL map) as an ignition timing map, respectively. Then, at a step 25, a processing is performed so as to turn the revolution limiter value $N_{HFC}$ to the value $N_{HFC1}$ for the low-speed valve timing.

When the instruction to open the valve has been given out at step 16, it is determined at step 18 whether or not the hydraulic switch 20 is turned off (i.e., to determine whether or not the oil pressure in the oil supplying passage 14 has increased to a higher level). When the hydraulic switch 20 has been turned off, it is at step 20 wherein it is determined whether or not the remainder time $t_{HVT}$ for the high-speed valve timing changeover delay timer has been reduced to 0. If it is found that $t_{HVT}$=0, the remainder time $t_{LVT}$ for the low-speed valve timing changeover delay timer is set to a predetermined time (for example, 0.2 second) at step 22. Next, at step 24, a selection processing is performed to select the $Ti_H$ map as a Ti map for use with the fuel injection control routine, and the ignition timing map for the high-speed valve timing (Θ igH) as an ignition timing map, respectively. Then, at step 26, a processing is performed so as to turn the revolution limiter value $N_{HFC}$ to the value $N_{HFC2}$ for the high-speed valve timing.

The time set for each of both the changeover delay timers described in the foregoing is predetermined so as to be receptive to the response delay time when the changeover mechanism 13 of each cylinder completes the required changeover operation as a result of the oil pressure change in the oil supplying passage 14. When the electromagnetic valve is changed over from the open position to the closed position, the program advances in the order of the following steps 17-20-22-24-26 until the hydraulic switch 20 is turned on. Even with the switch 20 turned on, the program is advanced in the order of the following steps 17-1

9-24-26 until the changeover mechanism 13 of each cylinder has been turned to the low-speed valve timing side. Furthermore, when the changeover valve 16 is not turned to its closed position, even with an instruction to close the valve due to a malfunction of the electromagnetic valve 19 or the changeover valve 16 resulting in the hydraulic switch 20 being unable to turn regardless of how long it takes, the program is then advanced similarly in the order of the following steps 17-20-22-24-26, as in the foregoing, so as to indicate that unless the changeover mechanism 13 of each of the cylinders has been turned to the low-speed valve timing side, the fuel injection remains so controlled so as to be suitable for the high-speed valve timing. When the electromagnetic valve 19 is changed over from the closed position to the open position, the fuel injection should remain controlled so as to be suitable for the low-speed valve timing in the like manner as above-described, unless the changeover mechanism 13 of each of all the cylinders has been set to the high-speed valve timing side.

Also, when the fail-safe operation is going on, or the engine is being started or the time preset with the delay timer has not yet expired after the start of the engine, or the engine warming-up is still going on, or the vehicle is parked or running at a slow speed, as previously described, the program is advanced to go from the steps 1 through 3 or 5 through 6 to step 27 in order to give out an instruction to close the electromagnetic valve 19, and further advanced to go from step 27 to steps 21 - 23 - 25 in that order.

When at N or P position, the program is advanced to go from step 8 to step 28 wherein it is determined whether or not the $Ti_H$ map has been previously selected. Then, when Ne is found to be smaller than $Ne_1$, the program is advanced to go from step 9 to step 29 at which time a like determination or discrimination as made in step 29 is carried out. If it is found that the $Ti_H$ map has been previously selected, the program is advanced to go from steps 28, 29 to step 15. If the $Ti_H$ map has not been selected previously for use, i.e., when the changeover mechanism 13 of each of the cylinders has not been set to the high-speed valve timing side, the program advances in the order of the following steps 27 - 21 - 23 - 25, as in the foregoing, so that the fuel injection may be controlled so as to be at the low-speed valve timing regardless of the condition of the hydraulic switch 20. This is a countermeasure designed to deal with the hydraulic switch in case the switch 20 remains turned off due to any break in its wiring.

More specifically, $N_{HFC1}$ is set higher than $Ne_2$. Thus, the valve timing is normally changed over to the high-speed level before Ne has increased to $N_{HCF1}$; thereby, causing the $N_{HFC1}$ to be changed over to $N_{HFC2}$. Therefore, there is no fuel cut effected at $N_{HFC1}$. However, in the operating condition wherein the program is advanced to go from step 1 through step 8 to step 27, the low-speed valve timing is retained even when Ne exceeds $Ne_2$ due to racing or the like so that a fuel cut is effected at $N_{HFC1}$. Further, this fuel cut at $N_{HFC1}$ goes on until $t_{HVT}$ becomes zero (0); i.e., until the changeover mechanism 13 is actually set to the high-speed valve timing side, even after the low-speed valve timing has been changed over to the high-speed level.

Figure 8:
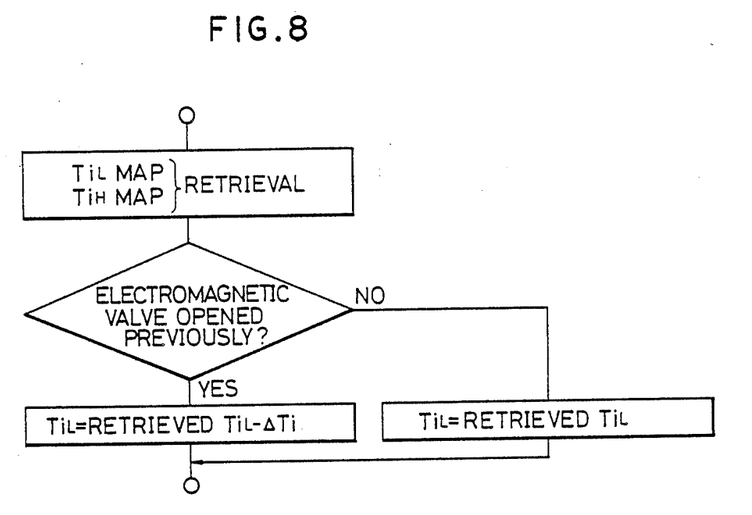
FIG. 8 is a flowchart of the subroutine for retrieval of a $Ti_L$ map and a $Ti_H$ map.

In the subroutine for retrieval of the $Ti_L$ map and the $Ti_H$ map at step 10, whether or not an instruction to open the electromagnetic valve 19 has been previously given out is determined as indicated in FIG. 8. When it is found that the instruction to open the valve has not been given out, the $Ti_L$ value to be used as step 14 is taken as a $Ti_1$ value retrieved from the $Ti_L$ map. When the instruction to open the valve has been given out, a processing to subtract a predetermined amount of hysteresis ATi from the retrieved $Ti_L$ value is performed so as to use the balance as the $Ti_L$ and the changeover characteristic in Y region in FIG. 6 is then added with the hysteresis.

Figure 9:
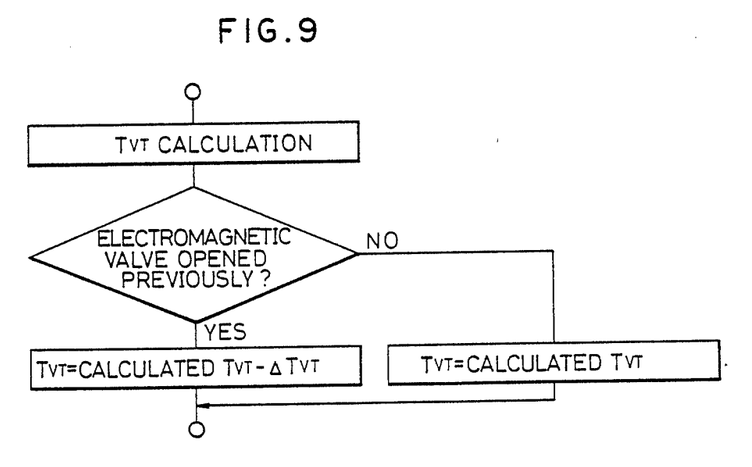
FIG. 9 is a flowchart of the subroutine for the calculation of $Ti_{VT}$.

Also, in the subroutine for calculation of $T_{VT}$ at the step 11, as shown in FIG. 9, whether or not the instruction to open the electromagnetic valve 19 has been previously given out is determined. When the instruction to open the valve has not been given out, $T_{VT}$ to be used at step 12 is calculated from the $T_{VT}$ table. When the instruction to open the valve has been given out, a processing to subtract a predetermined amount of hysteresis $AT_{VT}$ from the calculated value is performed so as to use the balance as the $T_{VT}$, and the changeover characteristic in X region in FIG. 6 is then added with the hysteresis.

While the invention has been particularly shown and described in reference to preferred embodiments thereof, it will be understood by those skilled in the art that changes in form and details may be made therein without departing from the spirit and scope of the invention.

What is claimed is:

1. An engine control apparatus comprising:
   a valve-timing changing means for changing at least one of a valve opening-closing timing and a valve-lift amount for a valve on at least one of an intake side and an exhaust side;
   a reduction means for reducing engine output when revolution speed of said engine has reached a predetermined upper-limit revolution speed during acceleration of the engine; and
   a revolution speed change means for changing said predetermined upper-limit revolution speed in accordance with at least one of a changed valve opening-closing timing and valve-lift amount effected by said valve-timing changing means.

2. An engine control apparatus according to claim 1, wherein said valve-timing changing means is a changeover means for step-wise changing of at least one of said valve opening-closing timing and said valve-lift amount.

3. An engine control apparatus according to claim 1, wherein said reduction means is for stopping fuel supply to said engine.

* * * * *